Nov. 16, 1937.  R. P. HOLSEN  2,099,606
BICYCLE LOCK
Filed Oct. 20, 1936  2 Sheets-Sheet 1

Ralph P. Holsen, INVENTOR
BY Victor J. Evans & Co.
ATTORNEYS

Nov. 16, 1937.  R. P. HOLSEN  2,099,606

BICYCLE LOCK

Filed Oct. 20, 1936  2 Sheets-Sheet 2

Ralph P. Holsen, INVENTOR
BY Victor J. Evans & Co.
ATTORNEYS

Patented Nov. 16, 1937

2,099,606

UNITED STATES PATENT OFFICE 2,099,606

BICYCLE LOCK

Ralph P. Holsen, Milwaukee, Wis.

Application October 20, 1936, Serial No. 106,654

2 Claims. (Cl. 70—227)

The invention relates to a cycle lock and more especially to a built-in bicycle lock.

The primary object of the invention is the provision of a lock of this character, wherein there is built into the upper rear wheel fork of the frame of a bicycle a lock serviceable for locking the driving wheel of such bicycle and replacing the old style padlock so often lost or left away from such cycle, the lock which is built into the bicycle can not mar the finish on the frame of such cycle and avoids the necessity of a tool case for the storage of the lock when not in use.

Another object of the invention is the provision of a lock of this character, wherein the construction thereof is novel in form and is practically theft-proof and when in locking position will assure maximum protection against the stealing of the bicycle or the operation of such bicycle by an unauthorized person.

A further object of the invention is the provision of a lock of this character, which is simple in construction, thoroughly reliable and efficient in its operation, at all times with the bicycle, readily and easily handled and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 3 is a sectional view on the line 3—3 of Figure 2.

Figure 4 is a fragmentary plan view of the lock showing its cover piece open.

Figure 5 is a horizontal sectional view showing a modification of lock.

Similar reference characters indicate corresponding parts throughout the several views in the drawings.

Figure 1:
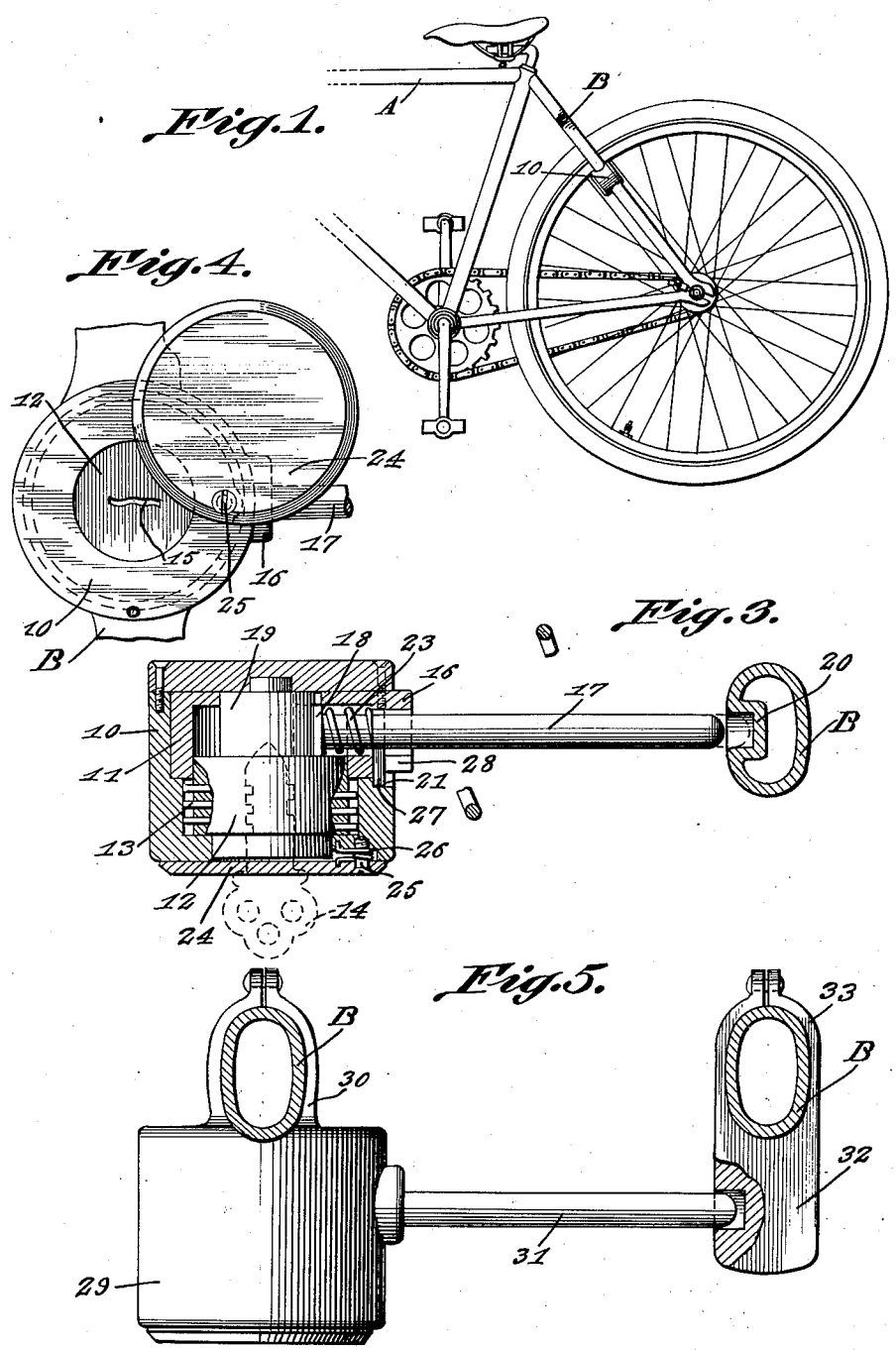
Figure 1 is a fragmentary side elevation of a bicycle showing the lock constructed in accordance with the invention applied.

Referring to the drawings in detail, A designates generally a portion of a bicycle frame which is of standard kind and B the upper rear wheel fork of such frame. In one arm or limb of this fork B is formed a circular housing 10 in which is fitted the lock constituting the present invention and hereinafter fully described.

This lock includes a rotating casing 11 accommodating a cylinder 12 for tumbler mechanism 13. The tumbler mechanism 13 coacts with the housing 10 to lock the casing in a turned position. The tumbler mechanism is controlled by a key 14 insertable in a keyway 15 provided in the cylinder 12.

The casing 11 is provided with a lateral barrel extension 16 in which operates a throw bolt or locking pin 17 having at its inner end a cam displaceable head 18 having contact with a cam 19 coacting with the cylinder 12. The other arm or limb of the fork opposite the housing 10 is provided with a keeper 20 which is formed by indenting the inner side of the said arm or limb of the fork B and in this keeper is received the free end of the bolt or pin 17 when moved to locking position. It is understood that when the bolt or pin is in locking position it straddles the fork B and is disposed between the spokes of the rear driving wheel of the bicycle so that the latter is retarded or barred against rotation.

The housing 10 is cut away or provided with a clearance 21 for the barrel extension 16 to permit the casing 11 to rotate in the housing 10 for the swinging of the bolt or pin 17 to operative or inoperative position.

Beneath the housing 10 and provided in that limb or arm having said housing is a recess 22 which accommodates and conceals the bolt or pin 17 when in inoperative position.

Surrounding the bolt or pin 17 and working against the head 18 is a coiled expansion spring 23 which functions to hold the head in contact or in working relation to the cam 19. The coiled expansion spring 23 is of such tension as to hold the head in contact with the cam 19 while the bolt 17 is swung into position. Then when the casing 11 is stopped in a horizontal position the cam 19 and the cylinder 12 continue their path and force the bolt 17 into the keeper 20 in the opposite arm of the fork.

The mouth of the keyway 15 is closed by a cover plate 24 pivoted at 25 exteriorly on the housing 10 and this cover plate has acting therewith a spring 26 which serves to urge the plate to closing position when the key 14 is removed from the keyway 15 in the cylinder 12.

The bolt or pin 17 carries a guide lug 27 which plays in a guide way 28 and in this manner the said pin or bolt can not be turned or rotated to dislodge the relation of the head 18 with the cam 19.

Figure 2:
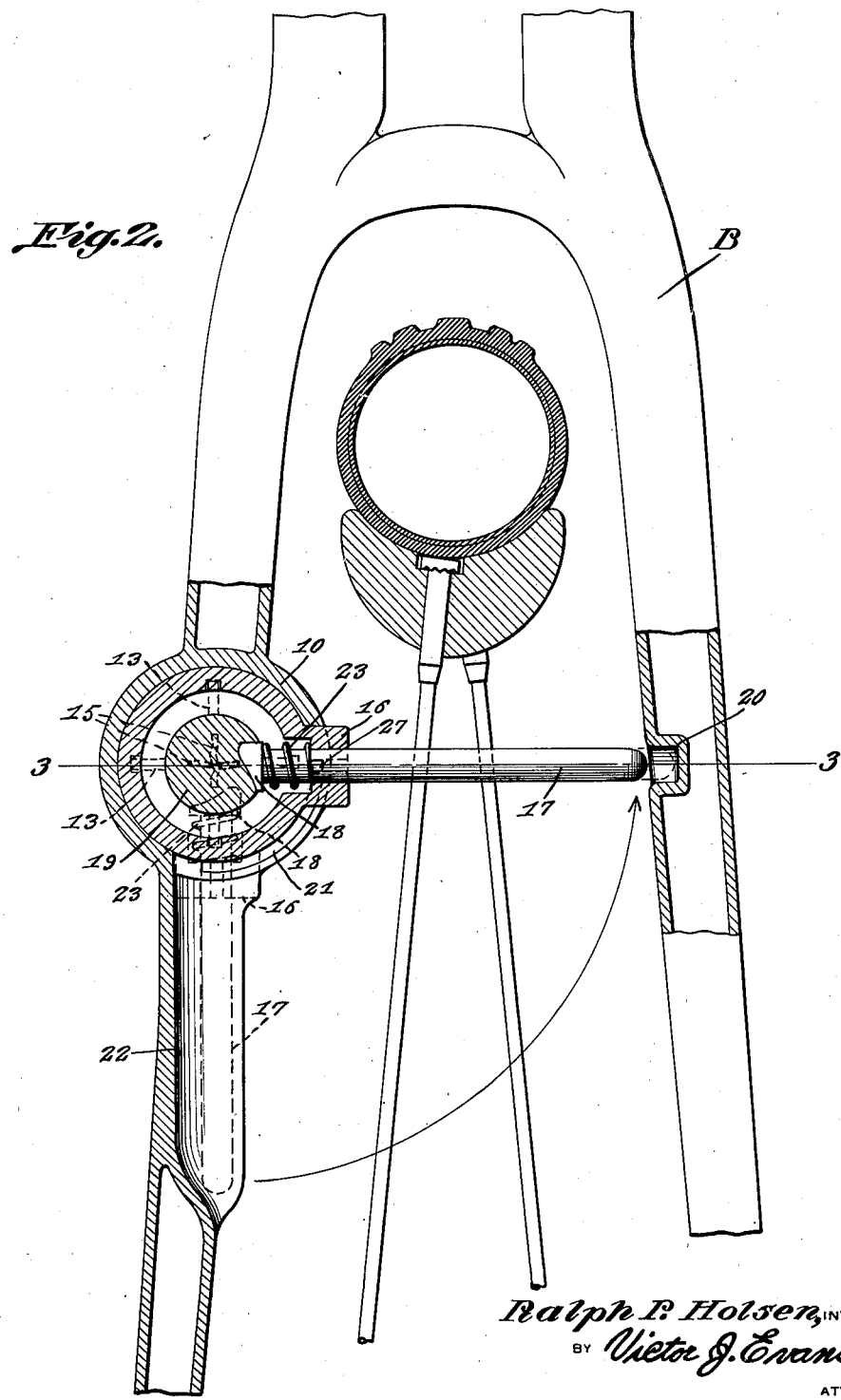
Figure 2 is an enlarged rear elevation partly in section of the upper rear wheel fork of the bicycle showing in detail the lock, one position thereof being indicated by dotted lines and the other position by full lines.

In the working of the lug normally the bolt or pin 17 is in the recess 22 as shown by dotted lines in Figure 2 of the drawings. When the bolt or pin 17 is moved to operative position it will straddle the fork B and engage in the keeper 20, the tumbler mechanism locking the said bolt or pin in this position while the head 18 riding the cam 19 will hold the bolt in its thrown locked position.

In Figure 5 of the drawings there is shown a slight modification wherein the housing 29 is independent of the fork B and is made secure thereon by a clamp 30, the locking bolt or pin 31 being engageable in a keeper 32 which is independent and separate of the said fork B and is made fast thereon by a clamp 33.

In Figures 1 to 4 of the drawings the lock is built into the bicycle frame while in Figure 5 of the drawings there is shown the modified form which is built into such frame but is separate therefrom and made fast thereto by the clamp hereinbefore described.

What is claimed is:

1. A lock of the character described comprising a housing for carriage upon a wheel fork of a bicycle frame, a turning casing fitting said housing and having a barrel extension, a locking bolt slidable in said barrel extension, a tumbler cylinder fitted within the housing and said casing and having a cam for action upon the bolt to move it to locking position, the bolt when in locking position being adapted to bridge a spoked portion of a bicycle wheel, and means acting with the bolt to hold it in working relation to the cam, the said fork having a recess for accommodating the bolt when in unlocked position.

2. A lock of the character described comprising a housing for carriage upon a wheel fork of a bicycle frame, a turning casing fitting said housing and having a barrel extension, a locking bolt slidable in said barrel extension, a tumbler cylinder fitted within the housing and said casing and having a cam for action upon the bolt to move it to locking position, the bolt when in locking position being adapted to bridge a spoked portion of a bicycle wheel, means acting with the bolt to hold it in working relation to the cam, the said fork having a recess for accommodating the bolt when in unlocked position, and means on the bolt for guiding it to and from locking position.

RALPH P. HOLSEN.